Sept. 16, 1930.   J. W. MILNOR   1,775,686
MEASURING RESISTANCE OF GROUND CONNECTIONS
Filed May 19, 1926
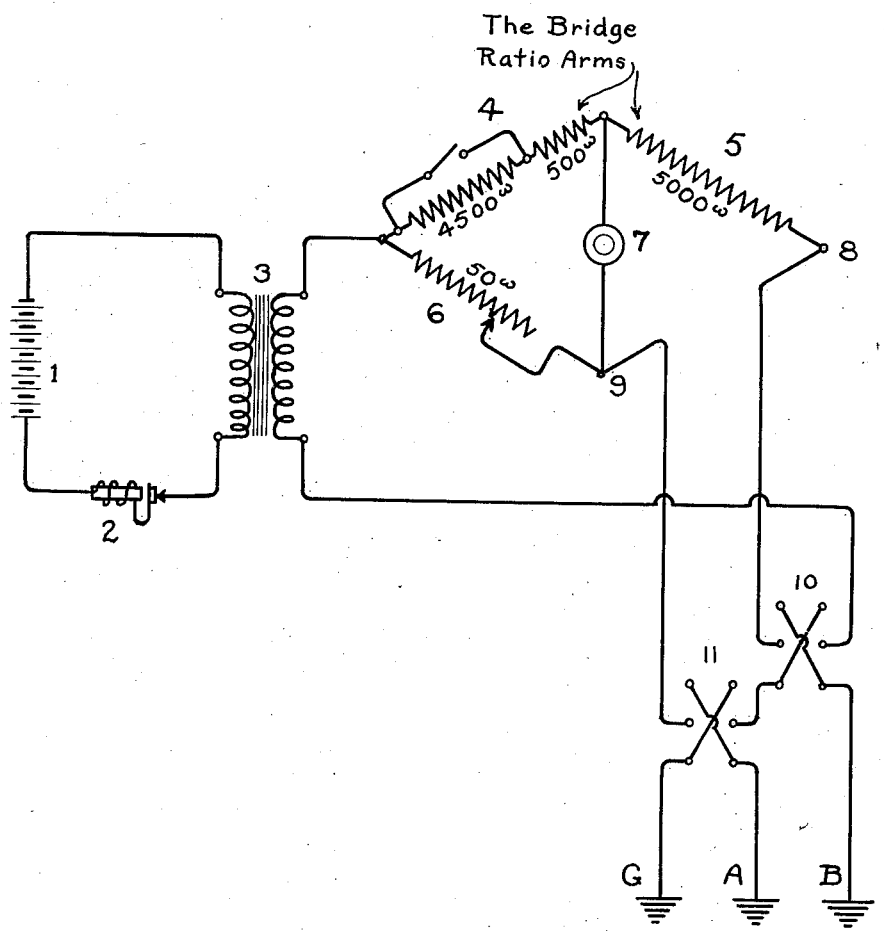
Inventor
 J.W. Milnor
By
 Eugene E. Brown
 Attorney Patented Sept. 16, 1930

1,775,686

UNITED STATES PATENT OFFICE

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK

MEASURING RESISTANCE OF GROUND CONNECTIONS

Application filed May 19, 1926. Serial No. 110,305.

My invention has for an object the measurement of the resistance of ground connections, such as central office grounds, protector and neutralizing transformer grounds, aerial cable grounds, and grounds used in connection with protective measures against power line hazards.

More particularly, my invention concerns a means for and method of ascertaining the resistance of a ground connection, which involves the taking of a single measurement only, if desired.

In all measurements of ground resistance, it is necessary to employ one or more auxiliary ground connections in addition to the one which is being investigated. Where possible, permanent grounds, such as underground water or gas piping systems or anchor rods, should be used. Where such grounds are not available, temporary grounds must be provided; these may usually take the form of iron pipes or ground rods driven into the earth far enough to make contact with the damp soil. If necessary, distant grounds may be used as auxiliary grounds, but in this case precautions must be taken against using connecting wires which might introduce errors from capacity or induction effects. In special cases it may also be necessary to measure the resistance of the conductor used to connect to a distant ground and to make allowance for this resistance in calculating the true resistance of the ground being tested.

Among the known methods of measuring the resistance of grounds is the Wheatstone bridge method. Ordinarily, two auxiliary grounds are required, and measurements are made of the resistance of each of the grounds in series with each of the others. From the three resistance values thus obtained, a set of equations involving three unknowns is set up, and the resistance of the ground under test, and also of the auxiliary grounds, if desired, calculated therefrom. The scheme of connections involves a source of testing current connected at one terminal to the junction of a pair of bridge ratio arms and at the other terminal to the junction of a variable resistance and a ground connection. The variable resistance forms the third arm of the bridge, and the fourth arm comprises two of the grounds in series. The balance indicating instrument is connected across the remote terminals of the ratio arms, in the usual manner.

Another method of measuring the resistance of a ground, known as the bridge and Varley method, involves the taking of one measurement with the regular Wheatstone bridge connections, and the taking of a second, or Varley, measurement, after connecting the second terminal of the testing source to a second auxiliary ground, instead of to the junction point of the variable resistance and the auxiliary ground which is in series with the ground under test. In other respects, the connections for taking the second measurement remain unchanged.

As in the Wheatstone bridge method, the value of the ground resistance under test is ascertained only after calculation. The calculation in this case involves setting up two equations representing the results of the two sets of measurements, (expressed in terms of the ground resistance under test and the resistance of the auxiliary ground in series therewith), and the solution of these equations to determine the value of one or both of the unknowns.

In contradistinction to these methods, the method of my invention requires the taking if only one measurement. This is due to the fact that the resistance of the bridge arms is made so high that the resistance of the auxiliary grounds can be neglected, and the required resistance determined directly from the single measurement, without calculations. For this reason the method may be called the high resistance bridge method. It is simpler than the other bridge methods previously described and may be recommended, therefore, for all around general use. It is quite rapid, on account of requiring but a single measurement, and no calculations and under ordinary conditions can be used without regard to the resistance in the auxiliary grounds.

The details of the method and means of my invention will be apparent from the following description, and the accompanying drawing, the single figure of which shows the apparatus and circuit connections forming one embodiment of the high resistance bridge system. It is to be understood that the values of resistance indicated are merely illustrative, and that other values may be used, the main requirement being that the resistance of the bridge arms shall be high compared to the resistance of an auxiliary ground.

As shown in the drawing, the source of testing current comprises a battery 1, connected in series with a buzzer 2 and the primary of an induction coil 3, the secondary of which is connected into one diagonal of a balanced bridge arrangement. A pair of bridge ratio arms 4 and 5, and a variable resistance 6, comprise three of the four arms of the bridge. The secondary of the induction coil is connected at one terminal to the junction point of bridge ratio arm 4 and the variable resistance 6, and at the other terminal to an auxiliary ground B. An indicating instrument 7, which may be a receiver, is connected to the remote terminals of ratio arm 4 and variable resistance 6. 8 and 9 are terminals of the bridge to which are connected, respectively, the second auxiliary ground "A", and the ground under test "G". Reversing switches 10 and 11 are provided for interchanging the auxiliary grounds, and for interchanging the main ground and an auxiliary ground; the purpose of these changes will subsequently appear.

The ratio arm 5 is shown as comprising a resistance of 5000 ohms, and the ratio arm 4 as two resistances in series, one of 4500 ohms and the other of 500 ohms, with means for short-circuiting the 4500 ohm resistance. Obviously, instead of this arrangement, alternative resistances of 5000 ohms and 500 ohms might be used in ratio arm 4 with means for substituting one for the other. The object of changing one ratio arm is to make it possible to measure grounds of high resistance as well as those within the usual range.

The variable resistance is shown as a rheostat of 50 ohms; however, it is obvious that other values may be used, depending on the ground to be tested.

The measurement is made in the following manner: Assuming that the various pieces of apparatus have been assembled and electrically connected in accordance with the diagram, the terminals 8 and 9 of the bridge are connected to the main and auxiliary grounds and the variable resistance arm adjusted until a balance is obtained. Where there is reason to believe that one of the auxiliary grounds is better than the other, the better ground should be chosen as ground "A", and connected to the bridge terminal, and the other as ground "B", and connected to one side of the induction coil.

Ordinarily, both ratio arms should be set at 5000 ohms, and then the reading of the variable arm will give the resistance of the ground under test, directly. In special cases where the ground to be measured is found to have an exceptionally high resistance, the ratio arms may be set at 5000 and 500 ohms, respectively, in which case the resistance of the ground under test will be ten times greater than the final reading of the variable arm.

In situations where both auxiliary grounds are very poor, it may be advisable, after the regular measurement has been made, to reverse the connections to ground "G" and ground "A", by means of switch 11, and measure the resistance of the auxiliary ground "A". The measured resistance of the main ground "G" may then be approximately corrected to allow for the error due to the resistance of ground "A", as follows:

Corrected resistance of ground "G"=G $(1+G\alpha/5000)$ in which

G=Measured resistance of ground under test.

$G\alpha$=Measured resistance of auxiliary ground "A".

This equation is deduced from the proportionality which exists under conditions of balance, among the four arms of the bridge, comprising (1) 5000 ohms, (2) 5000 ohms plus the resistance of ground "A", (3) the final value of the variable resistance, which is the measured resistance of ground "G", and (4) the actual resistance of ground "G".

Under ordinary conditions, however, the value of the resistance "A" is so small compared to the resistance, 5000 ohms, of the ratio arm, that the second of the above four values may be take to be substantialy 5000 ohms, equal to (1), in which case, (3) and (4) are also substantially equal. Under these conditions the voltage drop in ground "A" is so small as to be negligible.

Ordinarily where the resistance of "A" is neglected, the error introduced is negligible, since its amount is very small, rarely exceeding 10 per cent.

If desired, measurements may be taken using reversing switch 10 to interchange the auxiliary grounds "A" and "B". Of the two values thus obtained, the lower should be taken as the more nearly correct value for the resistance of ground "G".

What I claim is:

1. A balanced bridge arrangement, for measuring the resistance of a ground, comprising a source of testing current connected by way of an auxiliary ground to a divided path, the four arms of which are composed, respectively, of the ground under test, a pair of ratio arms one of which is completed through a second auxiliary ground, and a resistance variable to establish a balance.

2. A balanced bridge arrangement, for measuring ground resistance, comprising the ground under test, a pair of auxiliary grounds connected respectively in an arm of the bridge and in a bridge diagonal, a source of testing current in said diagonal, and a divided path for current from said source comprising two branches, the branch including the auxiliary ground including also resistance elements of value so high that the resistance of the auxiliary ground is negligible, and means for interchanging the auxiliary ground connections.

3. A balanced bridge arrangement, for measuring the resistance of a ground, composed of a source of testing current, a divided path for current from said source comprising two branches one of which includes a pair of high resistance ratio arms and a low resistance auxiliary ground in series, and the other a variable resistance and the ground under test in series, an indicating instrument, and means for connecting the instrument across the two branches between the ratio arms, on the one side, and between the variable resistance and the ground under test, on the other.

4. A balanced bridge arrangement for measuring the resistance of a ground, including a source of testing current, a divided path for current from said source comprising two branches, one of the branches including an auxiliary ground the resistance of which is negligible compared to the total resistance of the branch, an indicator the terminals of which are connected to the two branches, and means for establishing equipotential points at the terminals of the indicator.

5. A balanced bridge arrangement, for measuring ground resistance, composed of a source of testing current, a divided path for current from said source comprising two branches, one of the branches made up of a low resistance and the ground under test, the other branch made up of a pair of high resistance ratio arms and an auxiliary low resistance ground, an indicator the terminals of which are connected respectively between the ratio arms and between the low resistance and the ground under test, and means to vary the proportion of said low resistance effectively in circuit whereby equipotential points may be established at the terminals of the indicator.

6. A balanced bridge arrangement, for measuring ground resistance, composed of a source of testing current, a divided path for current from said source comprising two branches, one of the branches including a pair of high resistance ratio arms, the other branch including a variable resistance and the ground under test, an indicator across the divided path connected to a point between the ratio arms, and means to change the order of the resistance value of one of the high resistance ratio arms whereby the balanced bridge arrangement is capable of measuring ground resistances of widely differing values.

7. A balanced bridge arrangement for measuring ground resistance comprising the ground under test, a plurality of auxiliary grounds, a source of testing current connected at one terminal to one of the auxiliary grounds and at the other terminal to a divided path for current, said divided path comprising one branch including a pair of ratio arms connected to another auxiliary ground, and another branch including a variable resistance and the ground under test.

8. A balanced bridge arrangement, for measuring ground resistance, comprising the ground under test, a pair of auxiliary grounds, a source of testing current connected at one terminal to one of the auxiliary grounds and at the other terminal to a divided path for current, said divided path comprising one branch including a pair of ratio arms connected to the other auxiliary ground and the other branch including a variable resistance and the ground under test, and means for interchanging the ground under test and said other auxiliary ground.

9. A system for measuring the resistance of a ground comprising a balanced bridge including a pair of ratio arms, one of which is composed of a resistance and the other of a resistance and an auxiliary ground in series, a variable resistance in the third arm, the ground under test constituting the fourth arm.

10. In a resistance measuring system, a ground the resistance of which is to be measured, a pair of auxiliary grounds, a pair of ratio arms including resistances of values high compared to the resistance of the auxiliary grounds, an indicator, and connecting means to associate these elements in the form of a balanced bridge of which the variable resistance and the ground under test constitute substantially equal arms whereby a direct reading of said ground resistance is obtained.

11. An arrangement for measuring the resistance of a ground comprising a main ground and two auxiliary grounds, a branched path for current each branch of which includes one of the three grounds, a source of testing current connected between the third ground and the branched path, and mean for interchanging two of the grounds.

12. An arrangement for measuring the resistance of a ground comprising a main ground and two auxiliary grounds, a balanced bridge including a source of testing current connected to an auxiliary ground, a branched path for current from said source including an auxiliary ground in one branch and the main ground in the other, and means for interchanging the last two grounds.

13. An arrangement for measuring the resistance of a ground comprising a main ground and two auxiliary grounds, a balanced bridge including a source of testing current connected to an auxiliary ground and a branched path for current from said source comprising two branches, a pair of ratio arms and an auxiliary ground in one of said branches, a variable resistance and the main ground in the other branch, means for interchanging the auxiliary grounds, and means for interchanging the main ground and an auxiliary ground.

14. In a system for measuring ground resistance by a balanced bridge arrangement with auxiliary grounds, the bridge including an auxiliary ground in one of its arms, the method of obtaining a direct indication of the resistance of the ground under test which comprises reducing the proportion of current flowing through that auxiliary ground which is in one arm of the bridge to a value so low that the voltage drop in the auxiliary ground is negligible.

15. In a system for measuring ground resistance by a balanced bridge arrangement with auxiliary grounds, the method of finding the resistance of the ground under test which comprises establishing the resistance of that branch of the bridge including an auxiliary ground at such a value that the resistance of the auxiliary ground is small compared to the total resistance of the branch, varying the resistance of the other branch to establish points of equipotential at the terminals of the indicator, and noting the final value of the varied resistance as the value of the ground resistance under test.

16. In a system for measuring ground resistance by a balanced bridge arrangement with auxiliary grounds, the method of measuring the resistance of the ground under test which comprises establishing the resistance to current flow of that branch of the bridge including an auxiliary ground at such a value that the resistance of the auxiliary ground is small compared to the total resistance of the branch, varying the resistance of the other branch to establish points of equipotential at the terminals of the indicator, noting the value of the varied resistance under the condition of balance, substituting a second auxiliary ground for the first, repeating the three first described operations, and recording the lower value of the varied resistance as the resistance of the ground under test.

17. A balanced bridge arrangement for measuring the resistance of a ground comprising four arms and two diagonals, one arm of which is composed of the ground to be measured, means for connecting an adjacent ratio arm to said ground through an auxiliary ground, means for connecting a diagonal of said bridge to the ground to be measured through a second auxiliary ground, and a source of test current and an indicator in said diagonals.

18. The combination according to claim 17 together with means for interchanging said auxiliary grounds.

19. The combination according to claim 17 together with means for interchanging said ground to be measured and an auxiliary ground.

In testimony whereof I affix my signature.

JOSEPH W. MILNOR.